United States Patent
Kim et al.

(10) Patent No.: US 9,164,124 B2
(45) Date of Patent: Oct. 20, 2015

(54) APPARATUS AND METHOD FOR CONTROLLING AUTOMATIC GAIN OF INERTIAL SENSOR

(71) Applicant: SAMSUNG ELECTRO-MECHANICS CO., LTD., Suwon (KR)

(72) Inventors: Kyung Rin Kim, Suwon (KR); Byoung Won Hwang, Suwon (KR); Chang Hyun Kim, Suwon (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 552 days.

(21) Appl. No.: 13/899,863

(22) Filed: May 22, 2013

(65) Prior Publication Data
US 2014/0000340 A1    Jan. 2, 2014

(30) Foreign Application Priority Data
Jun. 27, 2012 (KR) .................. 10-2012-0069140

(51) Int. Cl.
| G01C 19/56 | (2012.01) |
| G01P 15/02 | (2013.01) |
| G01P 21/00 | (2006.01) |
| G01C 19/5776 | (2012.01) |

(52) U.S. Cl.
CPC ............ *G01P 21/00* (2013.01); *G01C 19/5776* (2013.01)

(58) Field of Classification Search
CPC .............. G01C 19/56; G01C 19/5719; G01C 19/5776; G01P 15/0888; G01P 15/18
See application file for complete search history.

(56) References Cited

U.S. PATENT DOCUMENTS

| 4,764,760 | A  * | 8/1988 | Bedard et al. ................ 340/680 |
| 5,992,233 | A  * | 11/1999 | Clark ......................... 73/514.35 |
| 6,250,156 | B1 * | 6/2001 | Seshia et al. ............... 73/504.12 |
| 6,445,195 | B1 * | 9/2002 | Ward ............................ 324/684 |
| 6,484,577 | B1 * | 11/2002 | Bennett ..................... 73/514.26 |
| 7,159,441 | B2 * | 1/2007 | Challoner et al. ............. 73/1.77 |
| 7,640,803 | B1 * | 1/2010 | Gutierrez et al. .......... 73/504.04 |
| 2006/0201250 | A1 * | 9/2006 | Kourepenis et al. ....... 73/504.16 |
| 2009/0007661 | A1 * | 1/2009 | Nasiri et al. ............... 73/504.03 |
| 2009/0033432 | A1 * | 2/2009 | Kanai et al. .................. 331/109 |
| 2010/0307243 | A1 * | 12/2010 | Prandi et al. ............... 73/504.12 |
| 2011/0121907 | A1 * | 5/2011 | Kanai et al. ..................... 331/65 |

* cited by examiner

*Primary Examiner* — David A Rogers
(74) *Attorney, Agent, or Firm* — NSIP Law

(57) ABSTRACT

Disclosed herein are an apparatus and a method for controlling an automatic gain of an inertial sensor. The automatic gain control apparatus of an inertial sensor includes: an inertial sensor; a driving unit; a detection unit; a state determination unit generates an AGC control signal according to the state of the driving mass; and a control unit that includes an AGC controlling to compensate for the driving displacement of the driving mass when the state of the driving mass is abnormal and performs a control to wake-up the AGC or convert the AGC into a sleep mode according to the AGC control signal input from the state determination unit to operate the AGC at the corresponding driving rate.

10 Claims, 2 Drawing Sheets

APPARATUS AND METHOD FOR CONTROLLING AUTOMATIC GAIN OF INERTIAL SENSOR

CROSS REFERENCE TO RELATED APPLICATION

This application claims the benefit of Korean Patent Application No. 10-2012-0069140, filed on Jun. 27, 2012, entitled "Apparatus And Method For Controlling Automatic Gain Of Inertial Sensor" which is hereby incorporated by reference in its entirety into this application.

BACKGROUND OF THE INVENTION

1. Technical Field

The present invention relates to an apparatus and a method for controlling an automatic gain of an inertial sensor.

2. Description of the Related Art

An inertial sensor has been used in various applications, for example, military, such as an artificial satellite, a missile, an unmanned aircraft, and the like, an air bag, electronic stability control (ESC), a black box for a vehicle, a hand shaking prevention camcorder, a mobile phone, motion sensing of a game machine, navigation, and the like.

The inertial sensor is classified into an acceleration sensor that may measure a linear motion and an angular velocity sensor that may measure a rotation motion.

Acceleration may be calculated by Newton's law of motion "F=ma", where "m" represents a mass of a moving body and "a" is acceleration to be measured. Further, angular velocity may be calculated by a Coriolis force "F=2 mΩ×v", where "m" represents the mass of the moving body, "Ω" represents the angular velocity to be measured, and "v" represents the motion velocity of the mass. In addition, a direction of the Coriolis force is determined by an axis of velocity v and a rotating axis of angular velocity Ω.

The inertial sensor performs an automatic gain control to continuously maintain a constant performance, regardless of the change in time or surrounding environment so as to accurately sense a targeted signal.

In this case, the most important characteristic of an automatic gain control apparatus of an inertial sensor is IC power consumption, in particular, when the inertial sensor is designed to be mounted in a mobile device, the automatic gain control apparatus requires design methods for operating IC at low power consumption if possible, while performing various functions required by a host.

SUMMARY OF THE INVENTION

The present invention has been made in an effort to provide an apparatus and a method for controlling an automatic gain of an inertial sensor that performs a control to perform an AGC by generating a wake-up signal when a state of a driving mass is abnormal and performs a control to convert the AGC to a sleep mode when the state of the driving mass is normal, based on the determination of the state of the driving mass of the inertial sensor.

According to a preferred embodiment of the present invention, there is provided an automatic gain control apparatus of an inertial sensor, including: an inertial sensor that detects accelerations and angular velocities of the corresponding axes based on vibrations of driving masses and Coriolis forces for each axis; a driving unit that vibrates the driving mass in a direction of the corresponding axis by applied driving voltage; a detection unit that detects a driving displacement of the driving mass vibrated by the driving unit; a state determination unit that compares the detected driving displacement with a preset target value to determine a state of the driving mass and generates an AGC control signal according to the state of the driving mass; and a control unit that includes an AGC controlling to compensate for the driving displacement of the driving mass when the state of the driving mass is abnormal and performs a control to wake-up the AGC or convert the AGC into a sleep mode according to the AGC control signal input from the state determination unit to operate the AGC at the corresponding driving rate.

The state determination unit may include: an operation state determination unit that calculates a difference between the detected driving displacement and the target value to determine the state of the driving mass as normality when the difference is within a margin value and determine the state of the driving mass as abnormality when the difference is out of the margin value; and an AGC control signal generation unit that generates and outputs a first AGC control signal including an oscillation stable flag (OSF) when the state of the driving mass is normal and generates and outputs a second AGC control signal not including the OSF when the state of the driving mass is abnormal.

The control unit may determine the input AGC signal as a first or second AGC control signal according to whether the OSF is included in the AGC signal input from the state determination unit and covert the AGC into a sleep mode to be operated at a low driving rate when the first AGC signal is input and wake-up the AGC to be operated a normal driving rate when the second AGC signal is input.

The control unit may calculate driving voltage corresponding to a difference between the detected driving displacement and the target value and apply driving voltage reset by reflecting the calculated driving voltage to the driving unit when the AGC is woken-up.

The automatic gain control apparatus of an inertial sensor may further include: an AD conversion unit that converts an analog signal detected by the detection unit into a digital signal and transfers the converted digital signal to the control unit; and a D/A conversion unit that converts the digital signal input from the control unit into the analog signal and transfers the converted analog signal to the driving unit.

The automatic gain control apparatus of an inertial sensor may further include: a filter unit that filters noises of the digital signal converted by the A/D conversion unit and transfers the filtered digital signal to the control unit.

According to another preferred embodiment of the present invention, there is provided an automatic gain control method of an inertial sensor, including: (A) vibrating a driving mass of an inertial sensor by driving voltage applied to a driving unit; (B) detecting a driving displacement of the vibrating driving mass; (c) comparing the detected driving displacement with a preset target value to determine a state of the driving mass and generating and outputting an AGC control signal according to the state of the driving mass; and (D) waking-up an AGC performing a control to compensate for the driving displacement of the driving mass to be operated at the corresponding driving rate and convert into a sleep mode according to the AGC control signal when the state of the driving mass is abnormal.

The step (C) may include: (C-1) calculating a difference between the detected driving displacement and a preset target value; (C-2) determining whether the difference is within a preset margin value to determine the state of the driving mass as normality when the difference is within a preset margin value and determine the state of the driving mass as abnormality when the difference is out of the preset margin value;

and (C-3) generating and outputting a first AGC control signal including an oscillation stable flag (OSF) when the state of the driving mass is normal and generating and outputting a second AGC control signal not including the OSF when the state of the driving mass is abnormal.

The step (D) may include: (D-1) determining whether the oscillation stable flag (OSF) is included in the AGC control signal; and (D-2) determining the AGC control signal as the first AGC control signal when the OSF is included in the AGC control signal to convert the AGC into a sleep mode to be operated at a low driving rate and determining the AGC control signal as the second AGC control signal when the OSF is not included in the AGC signal to wake-up the AGC to be operated at a normal driving rate.

The automatic gain control method of an inertial sensor may further include: after the step (D), (E) when the AGC is woken-up, calculating driving voltage corresponding to the difference between the detected driving displacement and the target value; and (F) applying driving voltage reset by reflecting the calculated driving voltage to the driving unit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
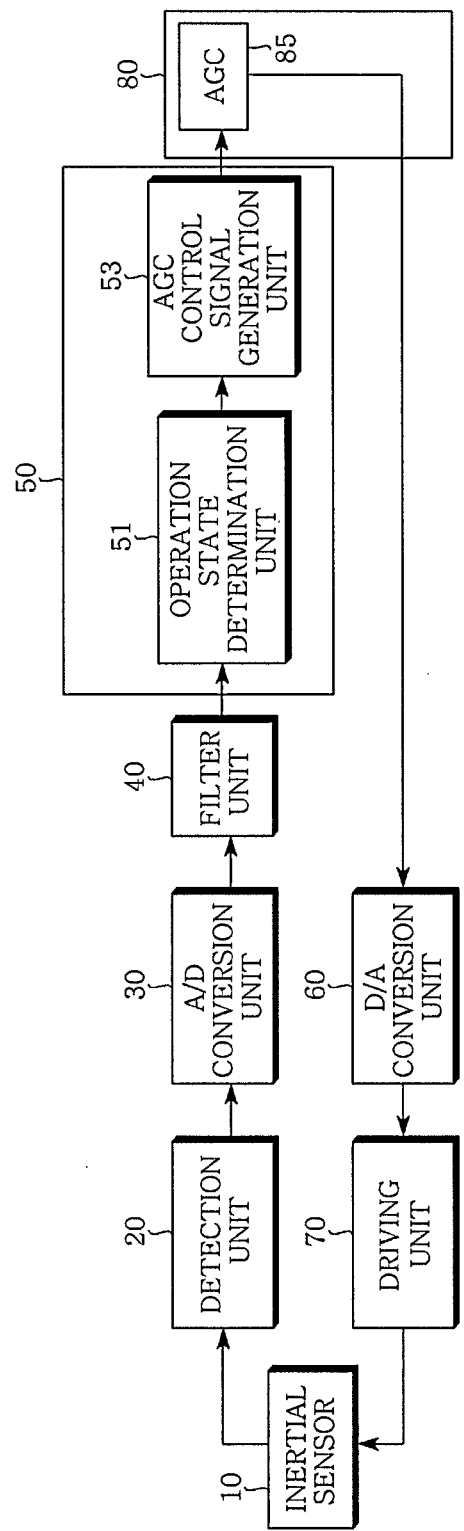
FIG. 1 is a block diagram of an automatic gain control apparatus of an inertial sensor according to a preferred embodiment of the present invention.

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first," "second," "one side," "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the attached drawings.

FIG. 1 is a block diagram of an automatic gain control apparatus of an inertial sensor according to a preferred embodiment of the present invention.

As illustrated in FIG. 1, an auto gain control (AGC) apparatus of an inertial sensor according to a preferred embodiment of the present invention is configured to include an inertial sensor 10, a detection unit 20, a state determination unit 50, a driving unit 70, and a control unit 80 including an AGC 85.

The inertial sensor 10 may include an acceleration sensor that may include a driving mass to detect accelerations in a plurality (for example, three) of axial directions located on a space or an angular velocity sensor that may detect angular velocities in a plurality of axial directions. The inertial sensor 10 generates signals corresponding to motions, such as movement and rotation and transfers the generated signals to the control unit 80 via the detection unit 20.

The driving unit 70 vibrates the driving mass in the corresponding axial direction by applied driving voltage. In this case, the driving unit 70 applies a predetermined driving voltage according to the control of the control unit 80.

The detection unit 20 measures and detects variation, that is, driving displacement of the driving mass that is resonated and vibrated in the inertial sensor 10 by the driving unit 70.

Herein, the detection unit 20 outputs the driving displacement of the driving mass resonated and vibrated by the driving voltage as a voltage waveform having a sine waveform, based on a predetermined reference voltage (for example, common mode voltage). In this case, an amplitude of a voltage waveform having a sine waveform may be changed according to the change in time and environment (for example, temperature).

In this case, in order to detect the driving displacement of the driving mass, the detection unit 20 compares the voltage waveform having the sine waveform with the reference voltage to invert the voltage waveform having the sine waveform to have a larger value (that is, considered the voltage waveform having a sine waveform as (+) signal) than the reference voltage and rectify the inverted voltage waveform having the sine waveform into a voltage waveform having a propagation mode when the voltage waveform having the sine waveform has a smaller value (that is, considered the voltage waveform having a sine waveform as a (−) signal) than the reference voltage.

Next, the detection unit 20 integrates the voltage waveform having the propagation mode to be smoothed into voltage having a DC form.

By doing so, the detection unit 20 detects the driving displacement of the driving mass by taking the smoothed voltage having the DC form as the driving displacement of the driving mass.

Meanwhile, the detection unit 20 may also detect the driving displacement of the driving mass by following up a peak value of the amplitude of the voltage waveform having the sine waveform for a predetermined period.

That is, even when the peak value of the amplitude of the voltage waveform having the sine waveform is slowly increased or reduced, the driving displacement of the driving mass is detected by taking the peak value of the amplitude of the sinusoidal voltage Vs as the driving displacement for the corresponding period.

The present invention proposes the foregoing two methods for allowing the detection unit 20 to detect the driving displacement of the driving mass but is not limited thereto, and therefore, the driving displacement of the driving mass may be measured by various methods.

The state determination unit 50 compares the driving displacement of the driving mass measured by the detection unit 20 with a preset target value to determine the state of the driving mass and generate the AGC control signal according to the state of the driving mass.

The state determination unit 50 is configured to include an operation state determination unit 51 and an AGC control signal generation unit 53.

The operation state determination unit 51 calculates a difference between the detected driving displacement and the target value to determine the state of the driving mass as normality when the difference is within a margin value and determine the state of the driving mass as abnormality when the difference is out of the margin value.

The AGC control signal generation unit 53 generates a first AGC control signal including an oscillation stable flag (OSF) when the operation state determination unit 51 determines the state of the driving mass as normality and generates a second AGC control signal not including the OSF when the operation state determination unit 51 determines the state of the driving mass as abnormality and then outputs the generated first and second AGC control signals to the control unit 80 to be described below.

In this case, the OSF is a signal that is generated when the driving displacement of the driving mass is operated stably, that is, in the target value or within a preset margin value.

Therefore, when the AGC control signal generation unit 53 generates the AGC control signal, the AGC control signal generation unit 53 may perform a control not to perform the unnecessary AGC according to whether the AGC control signal includes the OSF, that is, to perform the AGC only if necessary.

The control unit 80 generally controls the AGC apparatus of an inertial sensor according to the embodiment of the present invention.

In particular, since the state of the driving mass, that is, the driving displacement of the driving mass may be changed according to the change in time and environment (in particular, temperature), the control unit 80 performs the AGC of the driving displacement so that the driving displacement of the driving mass continuously has a constant value.

To this end, the control unit 80 includes an AGC 85 that compares the driving displacement detected by the detection unit 20 with the preset target value to determine the state of the driving mass and when the state of the driving mass is abnormal, performs a control to compensate for the driving displacement of the driving mass.

The control unit 80 will be described below in more detail with reference to FIG. 2.

Meanwhile, the AGC apparatus of an inertial sensor according to the embodiment of the present invention may combine an analog terminal with a digital terminal to more precisely control the AGC of the driving displacement of the driving mass.

To this end, the AGC apparatus of an inertial sensor may further include an A/D conversion unit 30 that converts an analog signal detected by the detection unit 20 into a digital signal and transfers the digital signal to the control unit 80, a D/A conversion unit 60 that converts the digital signal input from the control unit 80 into the analog signal and transfers the analog signal to the driving unit 70, and a filter unit 40 that filters noises of the digital signal converted by the A/D conversion unit 30 and transfers the filtered digital signal to the control unit 80. In this configuration, as the filter unit 40 a low pass filter (LPF) may be used.

Figure 2:
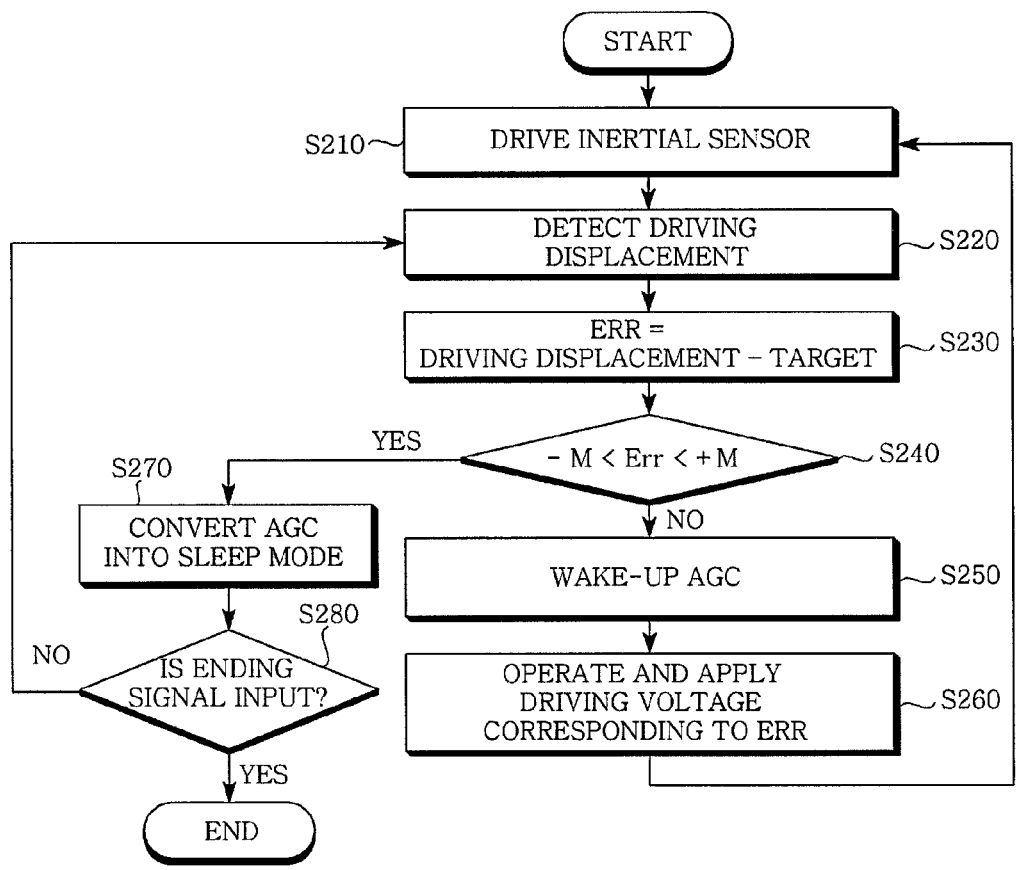
FIG. 2 is flow chart illustrating an automatic gain control method of an inertial sensor according to another preferred embodiment of the present invention.

FIG. 2 is flow chart illustrating an AGC method of an inertial sensor according to another preferred embodiment of the present invention.

Referring to FIG. 2, in the AGC method of an inertial sensor according to another preferred embodiment of the present invention, the predetermined driving voltage is applied to the driving unit 70 to vibrate the driving mass of the inertial sensor 10, thereby driving the inertial sensor 10 (S210).

In this case, the driving displacement of the driving mass resonated and vibrated by the driving voltage applied from the driving unit 70 is detected by the detection unit 20 (S220).

Next, the state control unit 80 (in detail, AGC 85) compares the driving displacement detected by the detection unit 20 with the preset target value to determine the state of the driving mass.

In detail, the state determination unit 50 calculates a difference Err(t) between the detected driving displacement t and the preset target value (S230) to determine whether the difference Err(t) is within the preset margin value (S240).

In S240, the operation state determination unit of the state determination unit 50 determines the state of the driving mass as normality when the difference Err(t) is within the margin value and determines the state of the driving mass as abnormality when the difference Err(t) is out of the margin value.

Therefore, the AGC control signal determination unit 53 of the state determination unit 50 generates and outputs the first AGC control signal including the oscillation stable flag (OSF) when the state of the driving mass is normal, that is, the difference Err(t) is within the margin value and generates and outputs the second AGC control signal not including the OSF when the state of the driving mass is abnormal, that is, the difference Err(t) is out of the margin value.

Next, the control unit 80 determines the AGC control signal as the first AGC control signal when the OSF is included in the AGC control signal input from the AGC control signal generation unit 53 of the state determination unit 50 to convert the AGC 85 into a sleep mode to be operated at a low driving rate (S270) and determines the AGC control signal as the second AGC control signal when the OSF is included in the AGC signal to wake-up the AGC 85 so as to be operated at a normal driving rate (S250).

Next, when the AGC is woken-up, the control unit 80 calculates the driving voltage corresponding to the difference between the detected driving displacement and the target value to apply driving voltage reset by reflecting the operated driving voltage to the driving unit (S280).

Meanwhile, after S270, the control unit 80 may further determine whether an ending signal is input (S280).

In S280, when the ending signal is input, the AGC of an inertial sensor according to the present invention ends, and when the ending signal is not input, the AGC method returns to S230 and repeats the following process.

According to the preferred embodiment of the present invention, it is possible to reduce the unnecessary power and current consumption by performing the AGC of the driving displacement of the driving mass only when the state of the driving mass is abnormal, based on the determination of the state of the driving mass.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. An automatic gain control apparatus of an inertial sensor, comprising:
    an inertial sensor that detects accelerations and angular velocities of the corresponding axes based on vibrations of driving masses and Coriolis forces for each axis;
    a driving unit that vibrates the driving mass in a direction of the corresponding axis by applied driving voltage;
    a detection unit that detects a driving displacement of the driving mass vibrated by the driving unit;

a state determination unit that compares the detected driving displacement with a preset target value to determine a state of the driving mass and generates an AGC control signal according to the state of the driving mass; and a control unit that includes an AGC controlling to compensate for the driving displacement of the driving mass when the state of the driving mass is abnormal and performs a control to wake-up the AGC or convert the AGC into a sleep mode according to the AGC control signal input from the state determination unit to operate the AGC at the corresponding driving rate.

2. The automatic gain control apparatus of an inertial sensor as set forth in claim 1, wherein the state determination unit includes:

an operation state determination unit that calculates a difference between the detected driving displacement and the target value to determine the state of the driving mass as normality when the difference is within a margin value and determine the state of the driving mass as abnormality when the difference is out of the margin value; and an AGC control signal generation unit that generates and outputs a first AGC control signal including an oscillation stable flag (OSF) when the state of the driving mass is normal and generates and outputs a second AGC control signal not including the OSF when the state of the driving mass is abnormal.

3. The automatic gain control apparatus of an inertial sensor as set forth in claim 2, wherein the control unit determines the input AGC signal as a first or second AGC control signal according to whether the OSF is included in the AGC signal input from the state determination unit and coverts the AGC into a sleep mode to be operated at a low driving rate when the first AGC signal is input and wakes-up the AGC to be operated a normal driving rate when the second AGC signal is input.

4. The automatic gain control apparatus of an inertial sensor as set forth in claim 1, wherein the control unit calculates driving voltage corresponding to a difference between the detected driving displacement and the target value and applies driving voltage reset by reflecting the calculated driving voltage to the driving unit when the AGC is woken-up.

5. The automatic gain control apparatus of an inertial sensor as set forth in claim 1, further comprising:

an AD conversion unit that converts an analog signal detected by the detection unit into a digital signal and transfers the converted digital signal to the control unit; and a D/A conversion unit that converts the digital signal input from the control unit into the analog signal and transfers the converted analog signal to the driving unit.

6. The automatic gain control apparatus of an inertial sensor as set forth in claim 5, further comprising:

a filter unit that filters noises of the digital signal converted by the A/D conversion unit and transfers the filtered digital signal to the control unit.

7. An automatic gain control method of an inertial sensor, comprising:

(A) vibrating a driving mass of an inertial sensor by driving voltage applied to a driving unit;

(B) detecting a driving displacement of the vibrating driving mass;

(c) comparing the detected driving displacement with a preset target value to determine a state of the driving mass and generating and outputting an AGC control signal according to the state of the driving mass; and (D) waking-up an AGC performing a control to compensate for the driving displacement of the driving mass to be operated at the corresponding driving rate and convert into a sleep mode according to the AGC control signal when the state of the driving mass is abnormal.

8. The automatic gain control method of an inertial sensor as set forth in claim 7, wherein the step (C) includes:

(C-1) calculating a difference between the detected driving displacement and a preset target value;

(C-2) determining whether the difference is within a preset margin value to determine the state of the driving mass as normality when the difference is within a preset margin value and determine the state of the driving mass as abnormality when the difference is out of the preset margin value; and (C-3) generating and outputting a first AGC control signal including an oscillation stable flag (OSF) when the state of the driving mass is normal and generating and outputting a second AGC control signal not including the OSF when the state of the driving mass is abnormal.

9. The automatic gain control method of an inertial sensor as set forth in claim 8, wherein the step (D) includes:

(D-1) determining whether the oscillation stable flag (OSF) is included in the AGC control signal; and (D-2) determining the AGC control signal as the first AGC control signal when the OSF is included in the AGC control signal to convert the AGC into a sleep mode to be operated at a low driving rate and determining the AGC control signal as the second AGC control signal when the OSF is not included in the AGC signal to wake-up the AGC to be operated at a normal driving rate.

10. The automatic gain control method of an inertial sensor as set forth in claim 7, further comprising: after the step (D), (E) when the AGC is woken-up, calculating driving voltage corresponding to the difference between the detected driving displacement and the target value; and (F) applying driving voltage reset by reflecting the calculated driving voltage to the driving unit.

* * * * *